United States Patent
Douthwaite et al.

(10) Patent No.: US 12,537,699 B1
(45) Date of Patent: Jan. 27, 2026

(54) RECONFIGURABLE, HIGH STABILITY GATE-TUNNELING PHYSICAL UNCLONABLE FUNCTION

(71) Applicant: Crypto Quantique Limited, London (GB)

(72) Inventors: Matthew Douthwaite, Copenhagen (DK); Ranganathan Desikachari, Cambridge (GB); Matthew James Schormans, Cambridge (GB)

(73) Assignee: Crypto Quantique Limited, London (GB)

( * ) Notice: Subject to any disclaimer, the term of this patent is extended or adjusted under 35 U.S.C. 154(b) by 0 days.

(21) Appl. No.: 18/979,115

(22) Filed: Dec. 12, 2024

(51) Int. Cl.
| | |
|---|---|
| *H04L 9/32* | (2006.01) |
| *G06F 30/36* | (2020.01) |
| *G06F 30/373* | (2020.01) |
| *G06F 30/38* | (2020.01) |
| *H03K 19/0185* | (2006.01) |
| *H03K 19/0948* | (2006.01) |

(52) U.S. Cl.
CPC ............ *H04L 9/3278* (2013.01); *G06F 30/36* (2020.01); *G06F 30/373* (2020.01); *G06F 30/38* (2020.01); *H03K 19/018521* (2013.01); *H03K 19/0948* (2013.01)

(58) Field of Classification Search
None
See application file for complete search history.

(56) References Cited

U.S. PATENT DOCUMENTS

| | | | | |
|---|---|---|---|---|
| 11,645,825 | B2* | 5/2023 | Tada | G06V 10/141 |
| | | | | 345/156 |
| 11,823,739 | B2* | 11/2023 | Asnaashari | G11C 7/24 |
| 11,980,026 | B2* | 5/2024 | Lai | H10B 20/20 |
| 2016/0191255 | A1* | 6/2016 | Haensch | G09C 1/00 |
| | | | | 380/44 |
| 2019/0165938 | A1* | 5/2019 | Lu | H01L 21/67265 |

OTHER PUBLICATIONS

B. Gao et al., "Concealable physically unclonable function chip with a memristor array," Science Advances 8, Research Article, Jun. 17, 2022, pp. 1-9. (Year: 2022).*
A. Zhao et al., "Purely Electrical Controllable Spin-Orbit Torque-Based Reconfigurable Physically Unclonable Functions," Advanced Electronic Materials, 2023, pp. 1-7. (Year: 2023).*

* cited by examiner

*Primary Examiner* — Leigh M Garbowski
(74) *Attorney, Agent, or Firm* — Wolf, Greenfield & Sacks, P.C.

(57) ABSTRACT

There is provided a circuit for a physical unclonable function comprising: first and second outputs; a cell comprising a plurality of CMOS devices; and a plurality of switching devices, the plurality of switching devices operable to connect a gate terminal of each of the plurality of CMOS devices to one of the first and second outputs, wherein a quantity of the plurality CMOS devices is a multiple of two, and wherein the circuit is configured such that each of the first and second output is connected to an equal quantity of the plurality of CMOS devices.

8 Claims, 7 Drawing Sheets

RECONFIGURABLE, HIGH STABILITY GATE-TUNNELING PHYSICAL UNCLONABLE FUNCTION

FIELD OF THE INVENTION

The present disclosure relates to a physical unclonable function (PUF) using CMOS transistors, and an associated analog front-end (AFE) interface architecture.

BACKGROUND

Physically unclonable functions (PUFs) are a cryptographic primitive that are used for authentication and secret key storage without the use of secure EEPROM or other expensive hardware. Instead of storing data in digital memory, a PUF derives a sequence of bits from the unique physical characteristics of a device. These unique characteristics are usually introduced during manufacture.

Known PUFs are provided using techniques based on what would commonly be considered to be classical or macroscopic physics, such as the scattering of laser light through a sheet of hardened epoxy in which tiny silica spheres are suspended, or manufacturing variability in gate delay in some circuits.

SUMMARY OF THE INVENTION

According to various aspects, examples and embodiments of the present disclosure, there is provided a circuit for a physical unclonable function comprising: first and second outputs; a cell comprising a plurality of CMOS devices; and a plurality of switching devices, the plurality of switching devices operable to connect a gate terminal of each of the plurality of CMOS devices to one of the first and second outputs, wherein a quantity of the plurality CMOS devices is a multiple of two, and wherein the circuit is configured such that each of the first and second output is connected to an equal quantity of the plurality of CMOS devices. By splitting each PUF cell into multiple devices, the cell can be reconfigured without affecting the mean total current flowing in each output of the PUF cell.

According to various further aspects, examples and embodiments of the present disclosure, there is provided a method of controlling a circuit as disclosed herein, the method comprising: for each switch configuration of a plurality of switch configurations for the plurality of switches, determining a magnitude of a difference between a current at the first output and a current at the second output; determining an optimal switch configuration of the plurality of switch configurations, the optimal switch configuration being the switch configuration causing a highest magnitude of the difference between the current at the first output and the current at the second output; and setting the plurality of switches to the optimal switch configuration.

According to various further aspects, examples and embodiments of the present disclosure, there is provided an analog front end circuit, comprising: a first input arranged to receive a first input current and a second input arranged to receive a second input current; a first branch and a second branch, each of the first and second branches comprising: an integrator; and a comparator, the comparator configured to compare the output of the integrator to a threshold; a first logic arrangement, a first input of the first logic arrangement coupled to an output of the first branch, and a second input of the first logic arrangement gate coupled to an output of the second branch, the first logic arrangement configured to output a signal having a duration proportional to a difference between the first input current and the second input current; an edge detector, a first input of the edge detector coupled to an output of the first branch, and a second input of the edge detector coupled to an output of the second branch; and a time-to-digital converter, a counter input of the time-to-digital converter coupled to an output of the first logic arrangement, the time-to-digital converter configured to output a digital signal indicative of a duration of the output signal of the first logic arrangement.

According to various further aspects, examples and embodiments of the present disclosure, there is provided a method of operating the circuit as described herein, comprising: providing the first input current at the first input and the second input current at the second input; coupling the first input to the input of the first branch, and the second input to the input of the second branch; coupling a first output of the edge detector to a counting direction input of the time-to-digital converter; determining that the output of the integrator has satisfied the threshold for both the first branch and the second branch; coupling the first input to the input of the second branch, and the second input to the input of the first branch; coupling a second output of the edge detector to a counting direction input of the time-to-digital converter; resetting a state of the integrator and comparator for each of the first branch and the second branch; determining that the output of the respective integrator has satisfied the respective threshold in both the first branch and the second branch; storing an output value of the time-to-digital converter in a memory.

According to various further aspects, examples and embodiments of the present disclosure, there is provided a method of determining a difference between a first input current and a second input current, the method comprising: integrating each of the first input current and the second input current; comparing each of the first integrated input current and the second integrated input current to a threshold; for a duration during which only one of the first integrated current and the second integrated current satisfy the threshold, outputting a signal, wherein a duration of a portion of the signal is indicative of a difference between the first input current and the second input current; setting an edge detection output signal to an output state, the output state indicative of which of the first integrated input current and the second integrated input current first satisfied the threshold; converting the duration of the signal to a digital value, the digital value indicative of the difference between the first input current and the second input current.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that example, but not necessarily in other examples.

Figure 1:
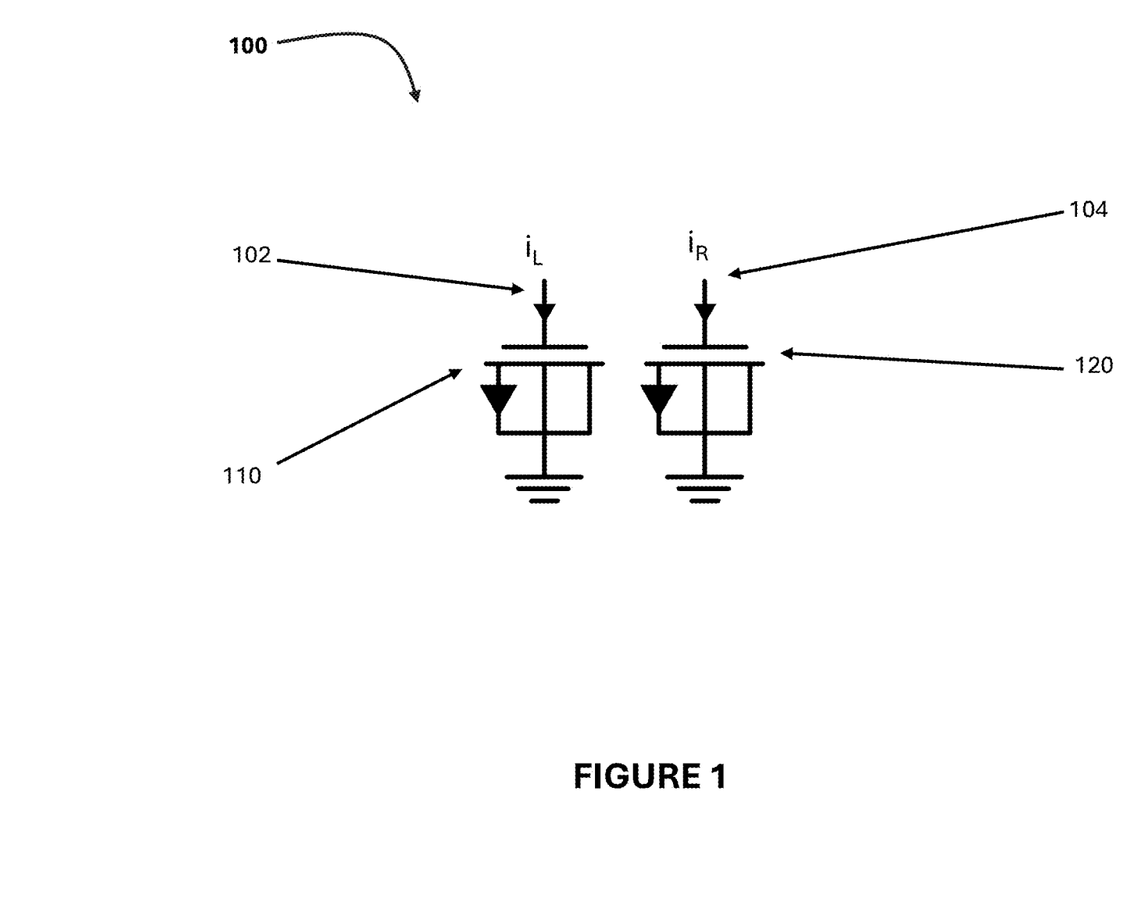
FIG. 1 shows a cell for a gate-tunneling based PUF cell.

FIG. 1 shows a cell for a gate-tunneling based PUF cell. The cell 100 comprises a first CMOS device 110 and a second CMOS device 120. A gate terminal of the first CMOS device 110 is connected to a left cell output 102. A gate terminal of the second CMOS device 120 is connected to a right cell output 104. The drain, source and bulk terminals of each of the first CMOS device 110 and the second CMOS device 120 are connected to ground. A gate-tunneling current iL is generated by the first CMOS device 110 at the left cell output 102. A gate-tunneling current iR is generated by the first CMOS device 120 at the right cell output 104. A mean current throwing at the output of a cell may be proportional to the area of each of the first and second CMOS devices 110, 120. The area, A, of each of the first and second CMOS devices 110, 120 may be substantially the same.

A conventional PUF cell comprises two identical CMOS devices (110, 120) with a voltage applied to the gate of each device so that two gate-tunneling currents ($i_L$, $i_R$) are produced. The mean current flowing through the output of the cell is proportional to the area of each device.

Across a large sample of manufactured devices, the gate-tunneling current ($i_L$, $i_R$) will exhibit an independent normal distribution with a mean and standard deviation ($\sigma$) determined in part by the area of the respective device, among other properties. By designing the two devices (first CMOS device 110 and second CMOS device 120) to have the same area, the distributions overlay, and therefore the differential output current $I_d = i_L - i_R$, will also be normally distributed with a near-zero mean and a slightly larger standard deviation. The standard deviation for the differential output current will be:

$$\sigma_d = \sqrt{\sigma_L^2 + \sigma_R^2}$$

The near-zero mean indicates that when a cell (i.e. a pair of devices) is randomly chosen, the differential output current is equally likely to be positive or negative. The differential current, $I_d$, can therefore be used to determine whether a cell produces a 1 or a 0 bit for the PUF. For example, $I_d<0$ could be defined as a 0, while $I_d>0$ could be defined as a 1.

However, there is also a noise on top of the circuit which means that for small values of Id, the result can randomly change between a positive and negative value each time it is read. A cell displaying this behavior can be considered an unstable cell, because in order for the PUF to operate correctly, it is required that a given cell will always produce the same output bit.

Unstable cells are masked-out (not used), which requires larger PUF arrays in order to provide additional redundant cells to account for the number of unstable cells. Alternatively, more unstable cells can be used, and an error correction code can be implemented. However, this approach requires additional helper data which must be stored in non-volatile memory, and takes up additional silicon area.

Figure 2:
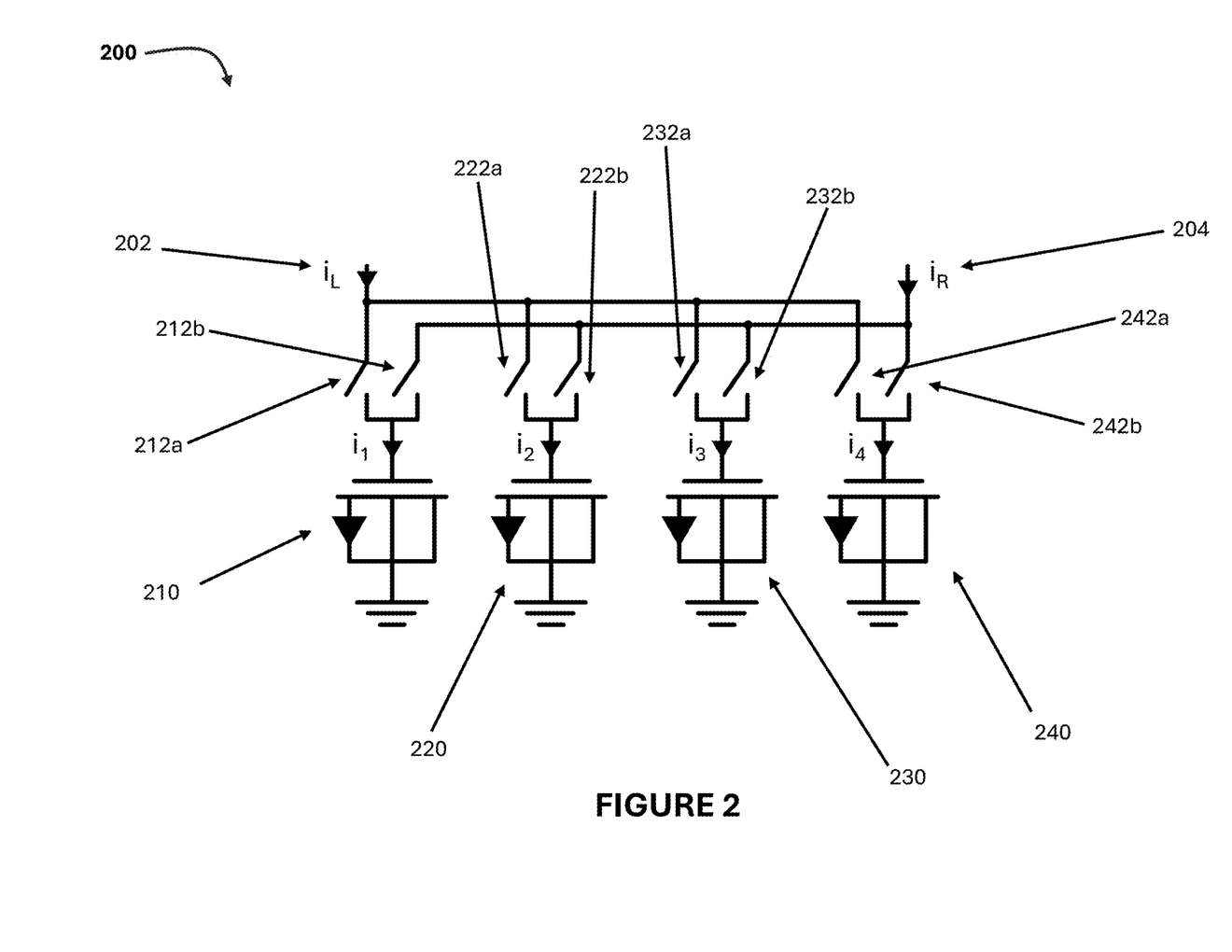
FIG. 2 shows a reconfigurable PUF cell comprising four devices, in accordance with aspects of the disclosure.

FIG. 2 shows a reconfigurable PUF cell comprising four devices, in accordance with aspects of the present disclosure. The cell comprises a left cell output 202, and a right cell output 204. The cell 200 comprises a first CMOS device 210, a second CMOS device 220, a third CMOS device 230, and a fourth CMOS device 240. Switches 212a, 212b are arranged to connect the first CMOS device 210 to the left cell output 202 and the right cell output 204, respectively. Switches 222a, 222b are arranged to connect the second CMOS device 220 to the left cell output 202 and the right cell output 204, respectively. Switches 232a, 232b are arranged to connect the third CMOS device 230 to the left cell output 202 and the right cell output 204, respectively. Switches 242a, 242b are arranged to connect the fourth CMOS device 240 to the left cell output 202 and the right cell output 204, respectively.

In operation, the switches are configured such that exactly half of the CMOS devices 210, 220, 230, 240 are connected to the left cell output 202, and exactly half of the CMOS devices 210, 220, 230, 240 are connected to the right cell output 204, such that the mean currents $i_L$ and $i_R$ flowing at the left cell output 202 and the right cell output 204 are equal. However, the currents $i_L$ and $i_R$ are now made up of two smaller currents, which are independent of each other and each also normally distributed. A gate-tunneling current $i_1$ is generated by the first CMOS device 210. A gate-tunneling current $i_2$ is generated by the second CMOS device 220. A gate-tunneling current $i_3$ is generated by the third CMOS device 230. A gate-tunneling current $i_4$ is generated by the fourth CMOS device 240.

The switches enable connection of each device to either the left cell output 202 or the right cell output 204, depending on the cell configuration. As each device has its own normal distribution, reconfiguring the cell can attempt to make two groups of devices with currents that produce the largest overall $I_d$.

With these changes, the output currents $i_L$, $i_R$ of the cell 200 can be reconfigurable. If one switch/device configuration produces a differential output current, $I_d$, with a magnitude that is too close to zero, then an alternative switch/device configuration can be selected in order to determine if an $I_d$ with a larger magnitude can be obtained. For a given PUF cell, the actual current in the two outputs will be slightly different for each configuration of devices that is combined to connect to an output. If all of the configurations where exactly half of the sub-devices are connected to each output are considered, then the currents will always be similar, but their difference will change for each configuration. As the devices can be modelled as independent randomly varying current sources, the probability that all configurations will be unstable is reduced dramatically as the number of devices is increased.

Note that the sign of the cell (i.e. whether it produces a 1 or a 0) is not important, as this is desirably still random between different cells. Therefore, only the absolute value of Id is of interest in determining an optimum device configuration for a cell, and thus configurations can be disregarded where the devices are in the same groups but connected to opposite outputs.

For example, considering the cell 200 of FIG. 2, switches 212a and 222a may be activated in order to connect devices 210 and 220 to the left cell output 202, whilst switches 232b and 242b may be activated in order to connect devices 230 and 240 to the right cell output 204. In this configuration, the current $i_L$ flowing at the left cell output 202 may be:

$$i_L = i_1 + i_2$$

and the current $i_R$ flowing at the right cell output 204 may be:

$$i_R = i_3 + i_4$$

In an alternative configuration of cell 200, switches 212a and 232a may be activated in order to connect devices 210 and 230 to the left cell output 202, whilst switches 222b and 242b may be activated in order to connect devices 220 and 240 to the right cell output 204. In this configuration, the current $i_L$ flowing at the left cell output 202 may be:

$$i_L = i_1 + i_3$$

and the current $i_R$ flowing at the right cell output 204 may be:

$$i_R = i_2 + i_4$$

In an alternative configuration of cell 200, switches 212a and 242a may be activated in order to connect devices 210 and 240 to the left cell output 202, whilst switches 222b and 232b may be activated in order to connect devices 220 and 230 to the right cell output 204. In this configuration, the current $i_L$ flowing at the left cell output 202 may be:

$$i_L = i_1 + i_4$$

and the current $i_R$ flowing at the right cell output 204 may be:

$$i_R = i_2 + i_3$$

Therefore, for a cell 200 having four devices (210, 220, 230, 240), there are three unique combinations for the groupings of devices, and therefore the chance of obtaining a stable configuration is improved compared to the single combination of the cell 100 of FIG. 1 (i.e. a single non-configurable combination that is either stable or not).

Although FIG. 2 considers an implementation with four devices, the number of devices may be any even number greater than 2. A larger number of sub-devices would enable more possible configurations, and thus increase the chance of obtaining a stable configuration. However, this benefit comes at the cost of an additional complexity in layout and implementation, as well as extra storage bits or latency to identify the optimum configuration for each cell. The number of valid configurations for a cell with n devices (where n is even) can be calculated as:

$$\text{number of combinations} = \binom{{}^nC_{(n/2)}}{2}$$

where 'C' represents 'choose', i.e. ${}^nC_r$ gives the number of ways to choose r items from n elements. For example, for a cell with four devices there are three unique combinations. For a cell with six devices there are ten unique combinations, and for a cell with eight devices there are thirty-five unique combinations.

The reconfigurable PUF cell provides more options to find stable cells, but does so using the existing cells, thus increasing the yield of the array. By splitting each PUF cell into multiple devices, the cell can be reconfigured without affecting the mean total current flowing in each output of the PUF cell. Splitting each PUF cell into multiple reconfigurable devices does incur a small increase in area compared to a non-reconfigurable PUF cell. However, this reconfigurable PUF cell can be seen as equivalent to three or more independent PUF cells, and therefore the reconfigurable PUF cell represents a more efficient use of area compared to simply adding additional cells and performing bit-masking.

The benefits of the reconfigurable PUF cell can be demonstrated by calculating the improvement in the probability that a given PUF cell will be stable when it is made to be reconfigurable. For example, a typical cell with two devices may have an 80% chance of being stable, so the probability of it being unstable is:

$$P(U) = 0.2$$

If the two devices are instead split into four devices, each with independently varying currents, and pairs of these devices can be combined in three unique sets, then the chance of all three configurations being unstable becomes:

$$P(U_{ALL}) = 0.2 \times 0.2 \times 0.2 = 0.2^3 = 0.008$$

If a given cell now has only a 0.8% chance of being unstable, then there will be fewer errors to correct in order to generate a seed. This reduces the requirements for helper data which is typically stored in non-volatile memory, and the array can be made smaller, reducing silicon requirements.

This analysis can be generalized for any reconfigurable cell with n devices, for an even integer n>2:

$$P(U_{ALL}) = P(U)^{\binom{{}^nC_{(n/2)}}{2}}$$

where 'C' represents 'choose', i.e. ${}^nC_r$ gives the number of ways to choose r items from n elements.

It is not necessary for the selection switches to be within the cell of the PUF array itself. Instead, according to some examples, switches may be shared between multiple cells such that there is a single set of switches per analog front-end. In such an implementation, a different combination of switches would still be used for each cell, as the output of each cell is unique, however this combination could be found each time a new cell is selected, or looked-up from a non-volatile media.

Figure 3:
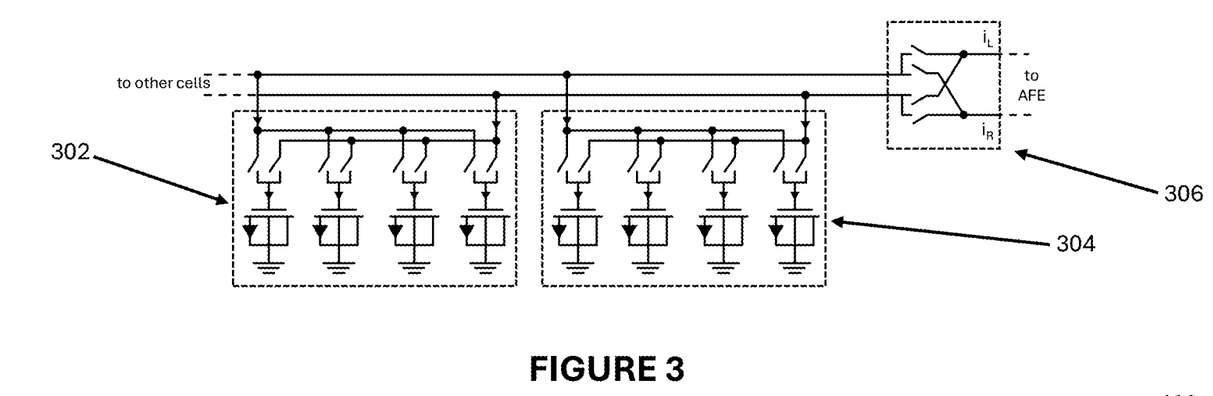
FIG. 3 shows a cell array arrangement, in accordance with aspects of the disclosure.

FIG. 3 shows a cell array arrangement, in accordance with aspects of the disclosure. In the arrangement of FIG. 3, each cell (302, 304) comprises its own set of configuration switches, and the input to the analog front-end comprises a set of swap switches 306. The cells 302, 304 can be enabled or disabled by changing the voltage on the drain/bulk/source connection. The swap switches 306 are operable to reconfigure the respective connections between the outputs of the cell and the branches of the analog front-end. The swap switches 306 can be used to enable offset cancellation in the analog front-end.

Figure 4:
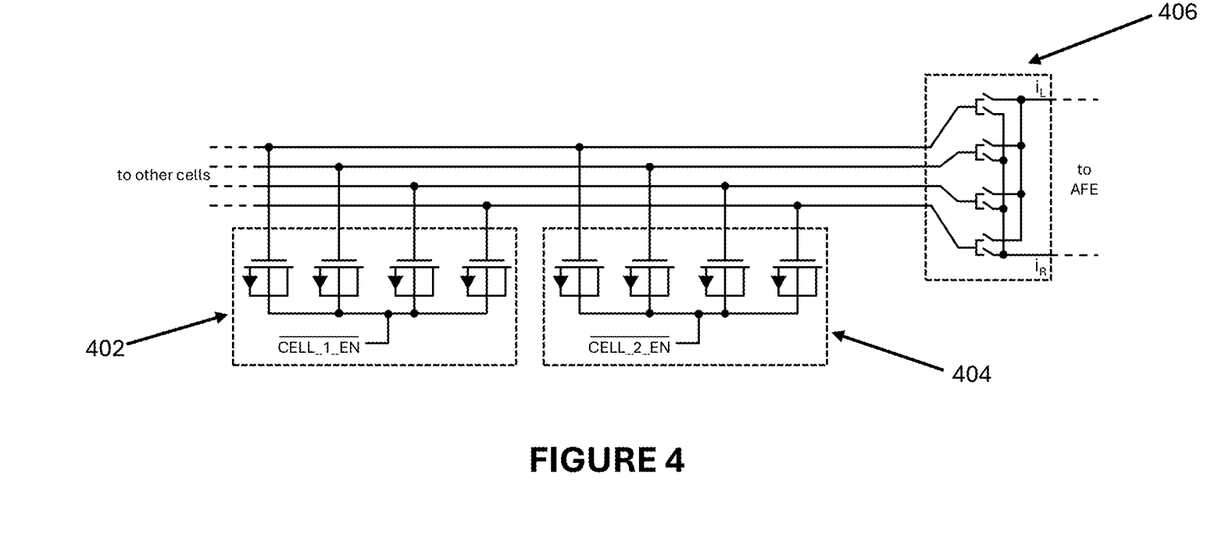
FIG. 4 shows an alternative cell array arrangement, in accordance with aspects of the disclosure.

FIG. 4 shows an alternative cell array arrangement, in accordance with aspects of the disclosure. In the arrangement of FIG. 4, all of the cells (402, 404) share a set of switches, the shared set of switches 406 functioning as both configuration switches and swap switches. In examples, it is more efficient to take the configuration switches out of the cell and instead locate all the switches at the input of the analog front-end. The SWAP function can be implemented by means of the configuration switches, simply by inverting a state of all of the switches in order to implement the SWAP.

The cells 402, 404 can be enabled or disabled by changing the voltage on the drain/bulk/source connection.

By removing the switches from the PUF cells, the cells are able to be significantly smaller, and thus the overall size of the array can be reduced.

Figure 5:
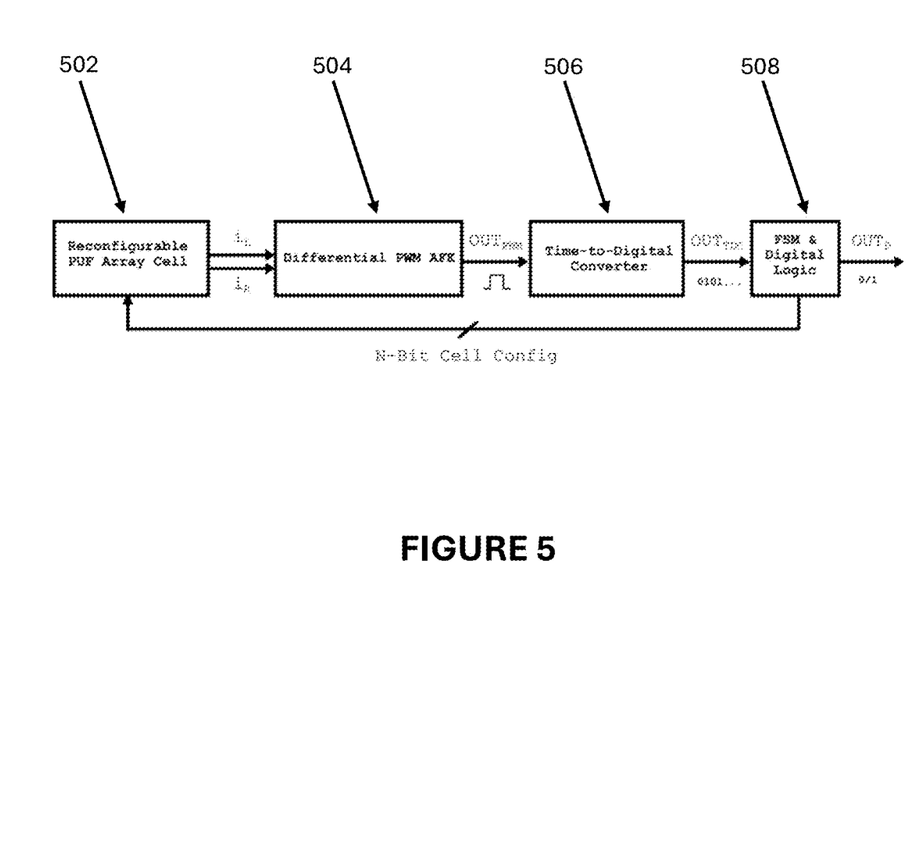
FIG. 5 shows a block diagram of components of a PUF system, in accordance with aspects of the disclosure.

FIG. 5 shows a block diagram of components of a PUF system, in accordance with aspects of the disclosure. The system comprises a reconfigurable PUF cell 502 that is operable to generate two currents, $i_L$ and $i_R$, from the gate-tunneling effect in CMOS MOSFETs. These currents are provided as input to a differential pulse-width modulation analog front-end 504, which produces a pulse width proportional to the difference between the input currents. The pulse signal is input to a time-to-digital converter 506 which quantizes this signal. Finally, a finite-state machine and digital logic 508 control the proceeding blocks in order to determine the optimum cell configuration for the PUF.

Figure 6:
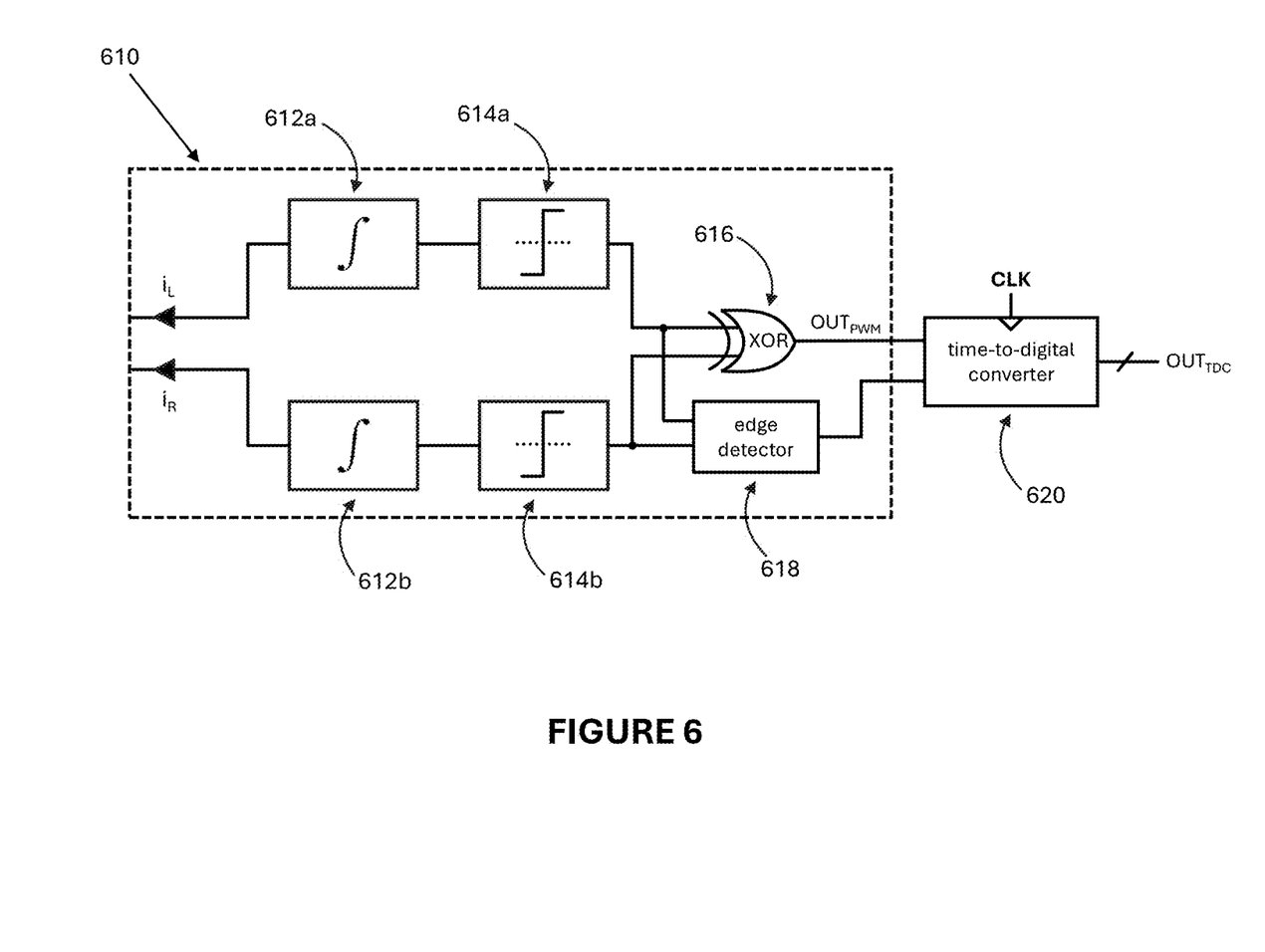
FIG. 6 shows a block diagram of a differential pulse-width modulation analog front-end and time-to-digital converter, in accordance with aspects of the disclosure.

FIG. 6 shows a block diagram of a differential pulse-width modulation analog front-end and time-to-digital converter, in accordance with aspects of the disclosure. The analog front-end 610 measures the difference between two input currents ($I_L$, $i_R$), which are typically only a few nano-Amps, which is converted to a digital value by the time-to-digital converter 620. This front-end arrangement has a small measurement offset and low silicon area requirements. The difference between the two input currents is determined by measuring a difference in time required for the two currents to charge a capacitor, and converting that time to a digital value using a clock and a counter.

The two currents ($I_L$, $i_R$) are each processed by a respective integrator 612a, 612b, whose output voltage rises until it reaches a certain threshold. When this threshold is reached, a respective comparator 614a, 614b, is triggered to capture the integration time. XOR logic 616 is used to generate a pulse width, said pulse width being proportional to the difference in integration times. An edge detector 618 is operable to determine which of the comparators is triggered first in time.

This approach can be applied to differential current measurements with source-measure capability (i.e. applying a fixed arbitrary voltage to the device to be measured). The use of inverter-based amplifiers saves area for the circuit. By using an analog front-end to produce a multi-bit digital output (as opposed to a 1-bit digital output), the latency required to identify an optimum cell configuration can be reduced, since only a single measurement is used for each configuration. This is in contrast to conventional methods of determining stability of a PUF cell, which instead uses temporal majority voting (TMV), which requires each cell (and, in this case, configuration) to be measured multiple times, which can take a prohibitively long time.

Once an optimum configuration (i.e. that which produces a signal with the greatest magnitude) is identified, it can either be stored in non-volatile memory (so that the identification phase is only performed once, lowering latency), or each configuration be tested on every read, which reduces non-volatile memory requirements at the expense of latency.

By digitizing the analog output of the PUF with the differential PWM analog front-end, a quick assessment of the different configurations with quantified measurements is ensured. In contrast, with conventional all-digital PUFs (e.g. SRAM) the only information about the cell available is a binary result, either through a comparator or intrinsic to the cell itself. Therefore, the only way to determine stability of a cell is to perform multiple reads, which increases latency for onboarding a cell, and provides a precision limited by the number of reads performed. In contrast, the PWM analog front-end is able to convert the signal to digital as early as possible, and more easily than a conventional integrator and ADC approach. Accuracy is maintained by performing a form of low-frequency chopping to cancel offsets. Compared to conventional analog front-ends, the present PWM analog front-end uses fewer components, and there are therefore fewer sources of noise.

Figure 7:
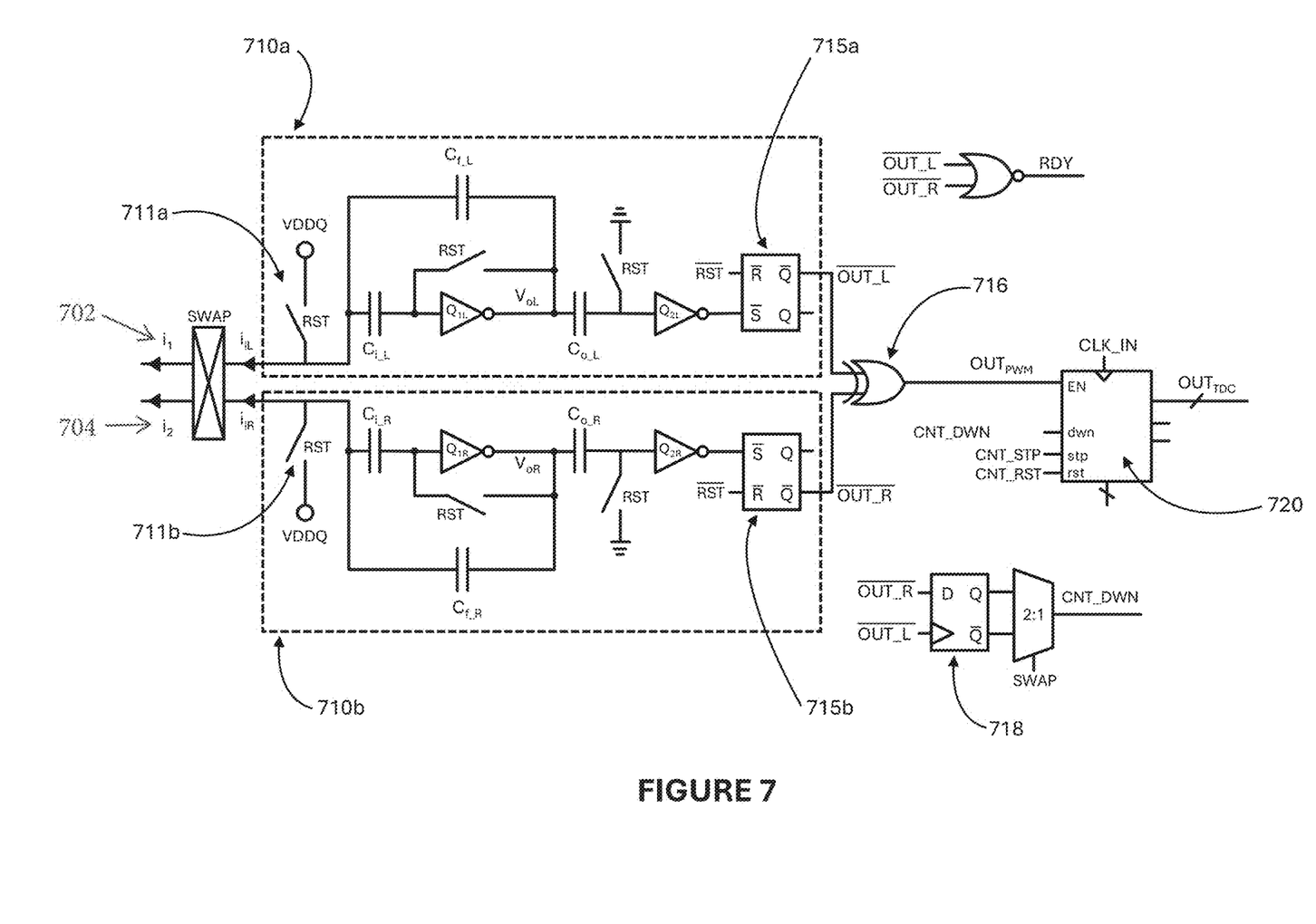
FIG. 7 shows a schematic of a front-end arrangement comprising differential pulse-width modulation analog front-end (DPWM AFE) and time-to-digital converter (TDC), in accordance with aspects of the disclosure.

FIG. 7 shows a schematic of a front-end arrangement comprising differential pulse-width modulation analog front-end (DPWM AFE) and time-to-digital converter (TDC), in accordance with aspects of the disclosure. For each configuration of a PUF cell, the differential output current (Ia) is quantified such that the largest absolute value can be used, for optimum stability of the PUF cell. The system architecture of the DPWM AFE followed by the TDC efficiently quantizes this signal. The architecture comprises two parallel branches 710a, 710b, one to process each of the input currents $i_L$, $i_R$. A PUF cell is connected to inputs 702, 704. A node voltage is defined through switches 711a, 711b to a reference voltage (VDDQ) during a reset phase. This provides the source-measure feature that means that a fixed voltage disconnected from the operation of the AFE is applied to the PUF cell. In some examples, the size of this voltage can be adjusted to adjust the mean current flowing through the PUF cell in a given configuration without affecting operation of the AFE. In a reset phase, respective inputs and outputs of integrators $Q1_L$ and $Q1_R$ are shorted, which establishes voltages across input capacitors $C_{i\_L}$, $C_{i\_R}$, and output capacitors $C_{o\_L}$, $C_{o\_R}$, respectively.

Once the reset switches (RST) are opened, the current in each branch flowing to left and right outputs of the PUF cell are integrated onto the capacitors $C_{f\_L}$ and $C_{f\_R}$, respectively, using an integrator. The output of voltage of the integrators $Q1_L$, $Q1_R$ rises linearly. The integration operation acts as a low-pass filter, which helps to reduce the high-frequency noise of the PUF cell, which effectively reduces the unstable region of the PUF cell. The integrator ($Q1_L$, $Q1_R$) and associated integrating capacitors ($C_{i\_L}$, $C_{i\_R}$) integrate the current to convert it to a voltage ramp. The integration of the current facilitates the conversion of current to time, but also acts as a low-pass filter to reduce high-frequency noise. In examples, each of the integrators ($Q1_L$, $Q1_R$) may further comprise an associated reset switch, pull-up switch and input capacitor ($C_{i\_L}$, $C_{i\_R}$). The input capacitors ($C_{i\_L}$, $C_{i\_R}$) allow for the voltage applied to the PUF cell (VDDQ) to be different to that required by to bias integrator (which is generally too low for generating an adequate gate-tunneling current). Thus, the mean current from the PUF cell can be tuned independently through VDDQ, whilst the integrator bias voltage can remain low.

The output ramp voltage of the integrators $Q1_L$, $Q1_R$ is coupled to the input of a respective 1-bit comparator, $Q2_L$, $Q2_R$. Optionally, the integrators are coupled to the comparators $Q2_L$, $Q2_R$ through respective output capacitors $C_{o\_L}$, $C_{o\_R}$. As the comparator switching voltage and the size of the integrating capacitors ($C_{f\_L}$, $C_{f\_R}$) on both branches (710a, 710b) are equal, differences in the currents will cause the comparator outputs in the two parallel branches to transition with a small time difference. The difference in transition of the comparator outputs is proportional to the difference in the reciprocal of the two currents. This relationship is given by:

$$\Delta T = C_f \Delta V \left( \frac{1}{i_l} - \frac{1}{i_r} \right)$$

where $C_f$ is the integration capacitor, and $\Delta V$ is the change in voltage required at the comparator input before the comparator transitions. The output capacitors ($C_{o\_L}$, $C_{o\_R}$) may act to decouple the output of the integrator and the input of the comparator ($Q2_L$, $Q2_R$) to allow for longer ramps, thus improving the signal to noise ratio. The comparators ($Q2_L$, $Q2_R$) produce a digital edge which indicates the time that the output voltage of the integrator has taken to rise by a certain voltage.

Some examples further include a set-reset (SR) latch 715a, 715b, which is used to prevent multiple edges occurring in the event that the integrator output is noisy (i.e. where the integrator output passes the comparator threshold multiple times).

The outputs of the two comparators ($Q2_L$, $Q2_R$) are connected to an XOR logic gate 716. The XOR logic gate 716 gives a 'high' output when exactly one of the comparators ($Q2_L$, $Q2_R$) has switched, and returns to a 'low' output when the second of the two comparators switches. Thus, the pulse width of the XOR gate output captures the difference in output time. The XOR gate produces a high signal when exactly one of the edges has arrived, and falls low again when the second edge arrives. This gives a pulse width equal to the difference in time required for the two integrators to integrate the two currents.

The pulse width is converted to a digital value by the TDC 720. The TDC 720 comprises a counter that is incremented by a clock while the XOR output is 'high'. The clock speed may be tuned depending on the expected pulse widths. In some examples, the clock period may be several times smaller than the shortest pulse of interest. In some examples, the clock speed is at least 10 MHz. The counter acts as a time-to-digital converter by measuring the pulse width at the output of the XOR gate and producing a digital result.

The XOR gate output can only represent the absolute current difference (i.e. it is high regardless of which edge arrives first). In order to determine which current is larger, an edge detector 718 can detect which comparator switches first. The edge detector 718 comprises a latch-based logic circuit. The comparator that switches first corresponds to the branch with the larger current. A D-type flip-flop in the edge detector 718 captures which edge arrives first and outputs a signal to the TDC 720 that indicates in which direction the counter should increment.

In examples, once one measurement has been taken via the AFE 710a and TDC 720, the connections to the PUF cell (or the SWAP switches) and the output of the edge detector 718 logic are inverted, and the measurement repeated without clearing the counter value of the TDC 720. The counter is able to count down as well as up, and so subtraction can be made with the first result. This allows for the circuit to cancel any fixed offset within the components, thus improving the accuracy of the final counter value. The result of the two measurements is a digital value that represents double the difference between currents $i_1$ and $i_2$, with very little residual offset. The cross coupled SWAP switches at the input and multiplexer at the output of the edge detector 718 allow for offset cancellation to improve the accuracy of the measurement.

In some examples, further pairs of measurements may be carried out to accumulate a larger result. This has a similar effect to performing a longer integration for better SNR, at the expense of increased latency.

The digital result can then be easily compared between each configuration of a given PUF cell, in order to determine the best configuration to use.

In some examples, the DPWM AFE utilizes only digital components, with single inverters used for the amplifiers. This means that the circuit requires very low silicon area and power compared to alternative architectures. With the advantages of low area and power, the circuit can be used to create light-weight PUF devices. Due to the low area and power, multiple AFEs can be places to read multiple cells in the PUF array in parallel, such that the latency to produce a seed is greatly reduced. It should be noted that while inverter-based amplifiers are advantageous in terms of area and power, alternative amplifier topologies could be used to produce the same or similar system output.

In order to increase the overall stability of a given PUF cell, each configuration can be checked to determine its individual stability (i.e. the magnitude if $I_d$). This can be done either upon first activation, with the results stored in a non-volatile memory, or on each access of the PUF cell, albeit at the expense of additional latency.

Once the magnitude of the signal in each configuration has been established, an optimum configuration can be selected to maximize the stability for each cell. In some examples, the configuration with the largest signal magnitude is chosen. If non-volatile memory is used, then the most stable configuration can be stored for future reads. Storing a configuration in memory does not reveal the result of a cell, as all configurations can be either a '1' or a '0'.

Figure 8:
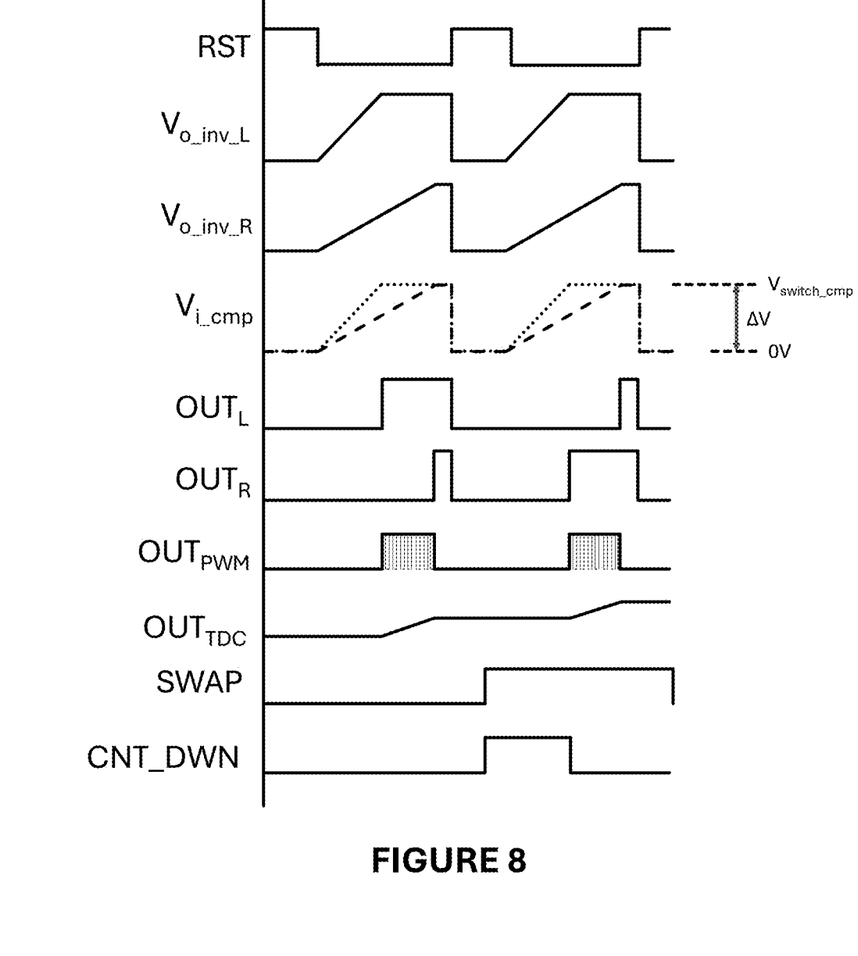
FIG. 8 shows a timing diagram of signals in the DPWM AFE, in accordance with aspects of the disclosure.

FIG. 8 shows a timing diagram of signals in the DPWM AFE, in accordance with aspects of the disclosure. The output voltages of $Q1_L$ and $Q1_R$, $V_{o\_inv\_L}$ and $V_{o\_inv\_R}$, respectively, rise linearly as the current is integrated until the respective comparator $Q2_L$, $Q2_R$ is triggered.

For a good SNR a longer ramp time is desirable. Therefore, to extend the time that the ramp takes to reach the switching threshold of the comparator, there should be a significant $\Delta V$, where $\Delta V = V_{switch\_comp} - V_{start}$. This performance can be difficult to achieve in situations where the integrator and comparator are connected directly together, so instead the integrator and comparator can be decoupled by an output capacitor $C_o$. $C_o$ enables the input to the comparator to begin at zero volts (where this input to the comparator is shorted to ground through a switch in the reset phase), i.e. $V_{start} = 0$, so that the change in voltage due to the integrator output ramp is $\Delta V = V_{switch\_comp}$.

The comparator produces a digital edge when the ramp reaches the switching threshold. The SR latch at the output of the comparator is used to prevent the $OUT_L$ and $OUT_R$ from double switching if the integration ramp is noisy and thus crosses the comparator switching threshold multiple times.

The XOR gate connected to $OUR_L$ and $OUT_R$ produces a high output when exactly one of the outputs is high. The width of the pulse at $OUT_{PWM}$ is therefore equal to the difference in time at which the edges of $OUT_L$ and $OUT_R$ arrive.

The counter is a time-to-digital converter which is triggered by a fast clock signal (generally at least 10 MHZ), and the $OUT_{PWM}$ signal. The counter counts for the duration of the $OUT_{PWM}$ high pulse, to provide the signal $OUT_{TDC}$. The digital output value of the counter divided by the clock frequency gives the width of the pulse in seconds.

Whether the counter increments or decrements is determined by the value of CNT_DWN. A D-type flip-flop is used to act as an edge detector, producing a low signal if the edge of $OUT_L$ arrives first and a high signal if the edge of $OUT_R$ arrives first. This can be used to determine the 'sign' of the $OUT_{PWM}$ pulse in the digital domain.

Offset cancellation can be performed with the help of SWAP switches at the input and a multiplexer (MUX) which selects which of the flip-flop outputs is used for the CNT_DWN signal at the output. After the first integration, the SWAP switches are reversed such that current $i_2$ is connected to input $i_L$ and current $i_1$ is connected to input $i_R$. At the same time, the inverting output of the D-type flip-flop is now used, effectively inverting the direction of the counter. These two actions mean that the final result of the counter, after two integrations (one in each SWAP position) will be:

$$OUT_D = C\Delta V\left(\left(\frac{1}{i_1} - \frac{1}{i_2}\right) - (-1)\left(\frac{1}{i_1} - \frac{1}{i_2}\right)\right)$$

Any offsets due to mismatches in the components between the SWAP switches and the counter are therefore cancelled out, as they are not inverted in the second phase.

In some examples, the PUF cell configuration switches may be taken out of the individual cells and instead combined with the SWAP switches. This saves area for each individual PUF cell and reduces the number of switches required.

While the disclosed reconfigurable PUF cell significantly reduces the number of unstable cells in an array, it is possible that there may still be some cells that are unstable (i.e. will change outputs) and therefore error correction code may still be required. This would require additional digital area to implement and for helper data to be stored in non-volatile media.

A technique to reduce errors in PUFs is bit-masking, which requires unstable cells to be identified and removed altogether from the set of cells that will generate a seed. This technique is effective but requires the array to be larger than necessary, as a certain percentage of cells may need to be discarded. The disclosed reconfigurable PUF cell can be efficiently combined with bit-masking by using spare states in the configuration bits to identify cells that are unstable in all configurations and so should be masked (removed) from the array.

In all configuration cases, the number of usable configurations, C, gives a non-integer value of log 2C, meaning there will be spare states available to use and therefore the additional masking comes at no extra cost. It should be noted that this is just one example of a use for the spare states of the configuration bits, and other uses could be envisaged. For example, a cell with four sub-devices, there are three unique configurations for the magnitude of $I_d$. The minimum number of bits to represent three configurations is 2 bits, but as 2 bits can have four states this leaves an additional unused state which could be used to mask a cell entirely. By using this method, the PUF array can utilize only cells which are fully stable and therefore no error correction would be required. In this case, an array would be the size of the required bits for the PUF seed plus additional bits to make up for the expected percentage of unstable reconfigurable cells (generally less than 1%). In this way, a PUF can be created with a smaller array, as error correction schemes would instead require a longer string of bits to produce a stable n-bit seed, and with fewer total stored bits, since only 2 bits per cell would be required for the example above.

For example, if a typical cell has an 80% chance of stability (a 20% chance of instability), with four devices, the chance of the cell being unstable becomes 0.8%. Therefore to obtain a 256 bit seed, only 259 (>256/(1−0.008)) reconfigurable cells would be needed to find 256 stable cell configurations. This would require just 518 configuration bits stored in non-volatile memory (2 bits per cell) and no error correction code, saving significant digital area. This scenario would represent a significant area saving in both analog and digital circuit area.

According to various aspects, examples and embodiments of the present disclosure, there is provided a circuit for a physical unclonable function comprising: first and second outputs; a cell comprising a plurality of CMOS devices; and a plurality of switching devices, the plurality of switching devices operable to connect a gate terminal of each of the plurality of CMOS devices to one of the first and second outputs, wherein a quantity of the plurality CMOS devices is a multiple of two, and wherein the circuit is configured such that each of the first and second output is connected to an equal quantity of the plurality of CMOS devices.

In some aspects, examples or embodiments, the plurality of CMOS devices comprises four CMOS devices.

In some aspects, examples or embodiments, the plurality of CMOS devices comprises six CMOS devices.

In some aspects, examples or embodiments, each CMOS device of the plurality of CMOS devices has a substantially equal area.

In some aspects, examples or embodiments, the plurality switches are configured to maximize a magnitude of a difference between a current at the first output and a current at the second output.

In some aspects, examples or embodiments, the cell comprises the plurality of switching devices.

In some aspects, examples or embodiments, the plurality of switching devices is situated separately from the cell.

Some aspects, examples or embodiments further comprise a plurality of cells, each cell of the plurality of cells comprising a respective plurality of switching devices.

Some aspects, examples or embodiments further comprise a plurality of cells, wherein each of the cells is connected to the plurality of switching devices.

According to various further aspects, examples and embodiments of the present disclosure, there is provided a method of controlling a circuit as disclosed herein, the method comprising: for each switch configuration of a plurality of switch configurations for the plurality of switches, determining a magnitude of a difference between a current at the first output and a current at the second output; determining an optimal switch configuration of the plurality of switch configurations, the optimal switch configuration being the switch configuration causing a highest magnitude of the difference between the current at the first output and the current at the second output; and setting the plurality of switches to the optimal switch configuration.

According to various further aspects, examples and embodiments of the present disclosure, there is provided an analog front end circuit, comprising: a first input arranged to receive a first input current and a second input arranged to receive a second input current; a first branch and a second branch, each of the first and second branches comprising: an integrator; and a comparator, the comparator configured to compare the output of the integrator to a threshold; a first logic arrangement, a first input of the first logic arrangement coupled to an output of the first branch, and a second input of the first logic arrangement gate coupled to an output of the second branch, the first logic arrangement configured to output a signal having a duration proportional to a difference between the first input current and the second input current; an edge detector, a first input of the edge detector coupled to an output of the first branch, and a second input of the edge detector coupled to an output of the second branch; and a time-to-digital converter, a counter input of the time-to-digital converter coupled to an output of the first logic arrangement, the time-to-digital converter configured to output a digital signal indicative of a duration of the output signal of the first logic arrangement.

In some aspects, examples or embodiments, the output signal of the first logic arrangement is indicative of a duration during which the output of the integrator satisfies the threshold for only one of the first branch and the second branch.

In some aspects, examples or embodiments, the edge detector is configured to output a signal indicative of for which of the first branch and the second branch the output of the respective integrator first satisfies the threshold.

Some aspects, examples or embodiments further comprise a switching arrangement, wherein in a first state the switching arrangement is configured to couple the first input to an input of the first branch and the second input to an input of the second branch, and wherein in a second state the switching arrangement is configured to couple the first input to an input of the second branch and the second input to an input of the first branch.

Some aspects, examples or embodiments further comprise a multiplexer, the multiplexer operable to selectively couple one of a first output of the edge detector and a second output of the edge detector to a counting direction input of the time-to-digital converter. In some aspects, examples or embodiments, the second output of the edge detector is inverted relative to the first output of the edge detector.

In some aspects, examples or embodiments, the time-to-digital converter comprises a counter, the counter configured to increment in response to an output of the first logic arrangement being in a predetermined state.

In some aspects, examples or embodiments, the integrator is further arranged to operate as a low-pass filter.

In some aspects, examples or embodiments, each of the first and second branch further comprises a decoupling capacitor arranged between an output of the integrator and an input of the comparator.

In some aspects, examples or embodiments, each of the first and second branch further comprises a latching arrangement coupled between an output of the comparator and the respective output of the first and second branch.

According to various further aspects, examples and embodiments of the present disclosure, there is provided a method of operating the circuit as described herein, comprising: providing the first input current at the first input and the second input current at the second input; coupling the first input to the input of the first branch, and the second input to the input of the second branch; coupling a first output of the edge detector to a counting direction input of the time-to-digital converter; determining that the output of the integrator has satisfied the threshold for both the first branch and the second branch; coupling the first input to the input of the second branch, and the second input to the input of the first branch; coupling a second output of the edge detector to a counting direction input of the time-to-digital converter; resetting a state of the integrator and comparator for each of the first branch and the second branch; determining that the output of the respective integrator has satisfied the respective threshold in both the first branch and the second branch; storing an output value of the time-to-digital converter in a memory.

According to various further aspects, examples and embodiments of the present disclosure, there is provided a method of determining a difference between a first input current and a second input current, the method comprising: integrating each of the first input current and the second input current; comparing each of the first integrated input current and the second integrated input current to a threshold; for a duration during which only one of the first integrated current and the second integrated current satisfy the threshold, outputting a signal, wherein a duration of a portion of the signal is indicative of a difference between the first input current and the second input current; setting an edge detection output signal to an output state, the output state indicative of which of the first integrated input current and the second integrated input current first satisfied the threshold; converting the duration of the signal to a digital value, the digital value indicative of the difference between the first input current and the second input current.

All of the features disclosed in this specification (including any accompanying claims, abstract, and drawings) may be combined in any combination, except combinations where some features are mutually exclusive. Each feature disclosed in this specification, including any accompanying claims, abstract, and drawings, may be replaced by alternative features serving the same, equivalent, or similar purpose, unless expressly stated otherwise. Thus, unless expressly stated otherwise, each feature disclosed in one example of a generic series of equivalent or similar features.

The present teachings are not restricted to the details of any of the foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A circuit for a physical unclonable function comprising:
a first output and second output;
a cell comprising a plurality of CMOS devices; and
a plurality of switching devices, the plurality of switching devices operable to connect a gate terminal of each of the plurality of CMOS devices to one of the first output and the second output,
wherein a quantity of the plurality of CMOS devices is a multiple of two, and
wherein the circuit is configured such that each of the first output and the second output is connected to an equal quantity of the plurality of CMOS devices.

2. The circuit of claim 1, wherein the plurality of CMOS devices comprises four CMOS devices.

3. The circuit of claim 1, wherein each CMOS device of the plurality of CMOS devices has a substantially equal area.

4. The circuit of claim 1, wherein the plurality of switching devices are configured to maximize a magnitude of a difference between a current at the first output and a current at the second output.

5. The circuit of claim 1, wherein the cell comprises the plurality of switching devices.

6. The circuit of claim 1, wherein the plurality of switching devices is situated separately from the cell.

7. The circuit of claim 1, further comprising a plurality of cells, each cell of the plurality of cells comprising a respective plurality of switching devices.

8. The circuit of claim 1, further comprising a plurality of cells, wherein each cell of the plurality of cells is connected to the plurality of switching devices.

* * * * *